US007812298B2

(12) United States Patent
Becherer et al.

(10) Patent No.: US 7,812,298 B2
(45) Date of Patent: Oct. 12, 2010

(54) PHOTOMULTIPLIER WITH FASTENING DEVICE

(75) Inventors: Frank Becherer, Haslach (DE); Winfried Rauer, Fischbach (DE); Ralf Körnle, Zell a. H. (DE)

(73) Assignee: Vega Grieshaber KG, Schiltach (DE)

( * ) Notice: Subject to any disclaimer, the term of this patent is extended or adjusted under 35 U.S.C. 154(b) by 0 days.

(21) Appl. No.: 12/219,374

(22) Filed: Jul. 21, 2008

(65) Prior Publication Data

US 2010/0001172 A1 Jan. 7, 2010

(30) Foreign Application Priority Data

Jul. 2, 2008 (EP) .................................. 08011901

(51) Int. Cl.

*H01J 40/14* (2006.01)
*H01J 31/50* (2006.01)
*H01J 43/04* (2006.01)
*G01T 1/20* (2006.01)

(52) U.S. Cl. ............................... 250/207; 250/214 VT; 250/361 R; 313/532

(58) Field of Classification Search ................. 250/207, 250/214 VT, 505.1, 214 AG, 361 R, 363.01, 250/390.01; 356/229, 230, 72, 311; 313/532, 313/533

See application file for complete search history.

(56) References Cited

U.S. PATENT DOCUMENTS

| | | | | |
|---|---|---|---|---|
| 3,305,689 | A * | 2/1967 | Leavy, Jr. et al. | 250/227.13 |
| 3,692,415 | A | 9/1972 | Shiller | |
| 2002/0079426 | A1 * | 6/2002 | Jones | 250/207 |
| 2009/0000428 | A1 * | 1/2009 | Flores et al. | 81/60 |

FOREIGN PATENT DOCUMENTS

| | | |
|---|---|---|
| FR | 2 297 416 | 8/1976 |

* cited by examiner

*Primary Examiner*—Georgia Y Epps
*Assistant Examiner*—Don Williams
(74) *Attorney, Agent, or Firm*—The Nath Law Group; Jerald L. Meyer; Stanley N. Protigal

(57) ABSTRACT

The invention relates to a photomultiplier (10) with a fastening device, where the photomultiplier (10) has a solid cylindrical body, particularly a glass body (11), and a tubular jacket, a light inlet (12) on the front end and connecting contacts (14) on the back end, and where the fastening device has a socket (20) on the front end and a plug contact (30) resting on the connecting contacts (14) on the back end, and where a force-fitting and form-fitting connection is produced between the plug contact (30) and the socket (20) by means of a connecting component (40).

11 Claims, 4 Drawing Sheets

PHOTOMULTIPLIER WITH FASTENING DEVICE

Figure 1:
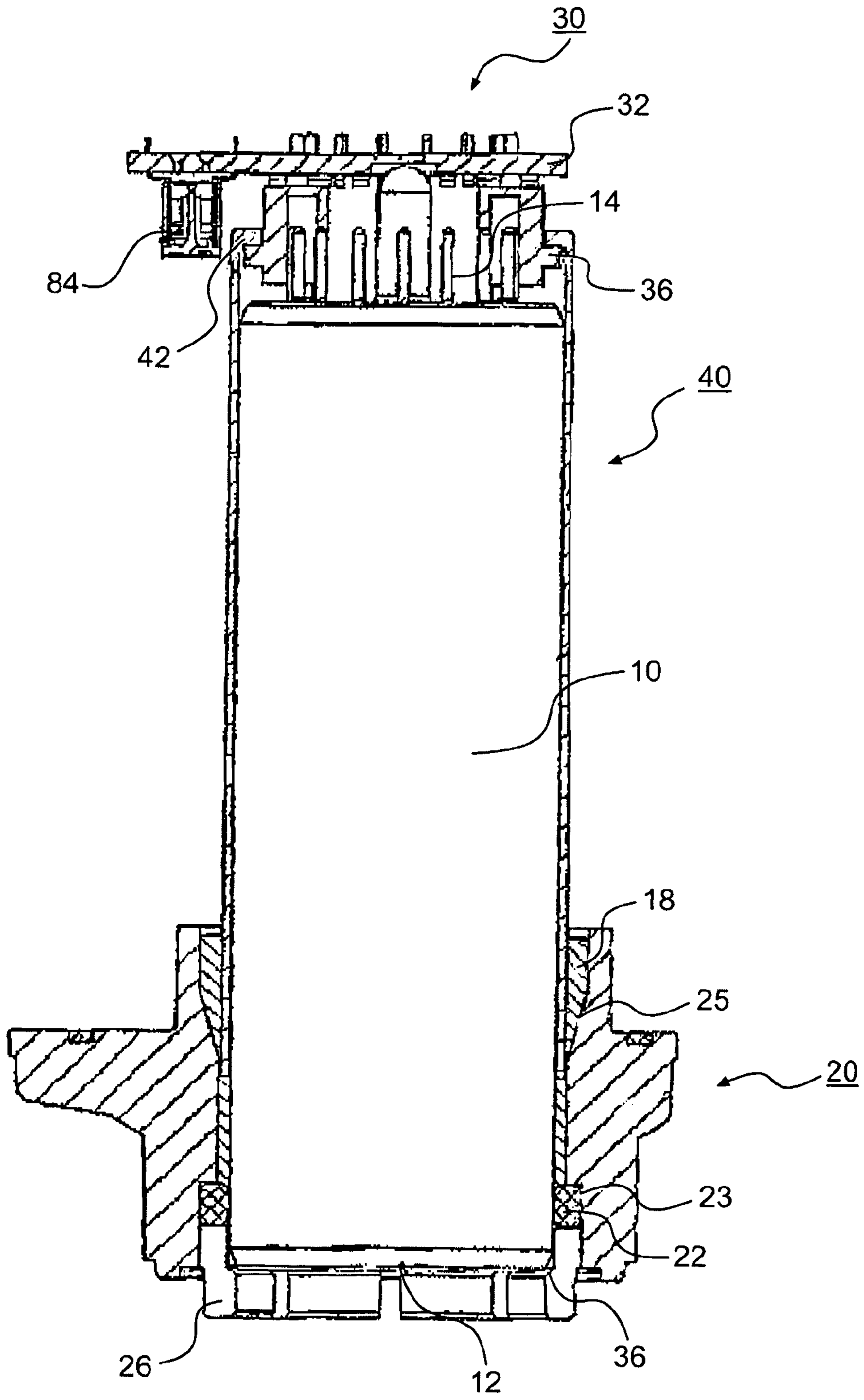

Photomultipliers are used in the prior art for the detection of weak light signals and the conversion of these signals into an electrical signal. A frequent area of application is represented by the so-called scintillation counter, in which ionizing radiation is converted into weak light flashes in a so-called scintillator, and these light flashes are then transformed into an electrical signal by the photomultiplier.

These scintillation counters are often applied in radiometric level measurement, where the fill being measured is radiated with a gamma source and the radiation penetrating the fill is detected with a scintillation counter.

Photomultipliers for such applications are widely available on the market, but have a disadvantage in that the cylindrically molded photomultiplier tubes exhibit a considerable longitudinal variation in their manufacture. For applications in which, at times, only a few photons are detected, it is nonetheless necessary to construct the photomultiplier with a high degree of precision and to make it as light-proof as possible. The photomultipliers available on the market are manufactured with a precision of ±5 mm over their length, so that in the least favorable case a difference of up to 10 mm may arise between the minimally available installation length and the maximally available installation length. When the installation is made in a fill measuring device that has many standard parts, longitudinal tolerances of this kind are not acceptable and must be corrected by an corresponding adjustment in length.

The goal of the invention is create a photomultiplier with a fastening device, such that deviations in the length of the photomultiplier can be corrected with said fastening device.

This goal is achieved by a photomultiplier with the features of patent claim 1.

Provided is a photomultiplier with a fastening device, such that the photomultiplier has a solid cylindrical body, particularly a cylindrical glass body, and a tubular jacket, and exhibits an optical inlet on the front end and connecting contacts on the back end. Furthermore, the fastening device has a socket on the front end and a plug contact that rests on the connecting contacts on the back end. A connecting component can be used to create a force-fitting connection between the plug contact and the socket.

A connection of this kind makes it possible to brace the photomultiplier between the socket positioned on the front end and the plug contact positioned on the back end, and at the same time to assure that no radial forces act on the relatively sensitive glass body of the photomultiplier.

If the connecting component is tubular and, in particular, is made of aluminum or steel tubing, a good degree of protection from outside impacts on the glass body of the photomultiplier is afforded, as is a particularly simple means of manufacture for the force-fitting connection. In the case of an aluminum tube, the diameter can be advantageously selected so that it surrounds the photomultiplier with a form-fit, or nearly so, and so that it can be connected to the plug contact at the back end by means of a plug connection, particularly a bayonet coupling. Here the plug contact has a circular rim and at least two recesses by means of which two projections formed onto the connecting component can be introduced, thus making it possible to lock the component into place in bayonet fashion.

The connecting component and the socket will preferably be joined adhesively, for example, with a sealing compound.

By allowing the connecting component to variably overlap with the socket, it is also possible to adjust for the manufacturing tolerances in the production of the photomultiplier.

To prevent the sealing compound from reaching the light inlet on the front end of the photomultiplier and to provide a centered orientation of the photomultiplier in the socket upon mounting, it is useful to position a sealing ring between the inner wall of the socket and the photomultiplier. The sealing ring may be positioned, e.g., in an inner groove of the socket.

To assure a constant spacing at the front end between the light inlet and a scintillator, as well as to assure the centered positioning of an optical conductor sheet between the scintillator and the light inlet, it is useful to provide the forward portion of the socket with a circumferential base or platform, which at the same time serves to keep mechanical influences from the front end of the photomultiplier.

On the inside, it is useful if the socket has a circular rim, which serves as a forward end-stop for the photomultiplier.

When a tubular connecting component is employed, it is useful in providing a centered alignment of the connecting component and the photomultiplier if the inside of the connector jack 34 is provided bumper ribs. These will guide the photomultiplier and the connecting component into a centered position and thus give it a correct alignment.

Figure 2B:
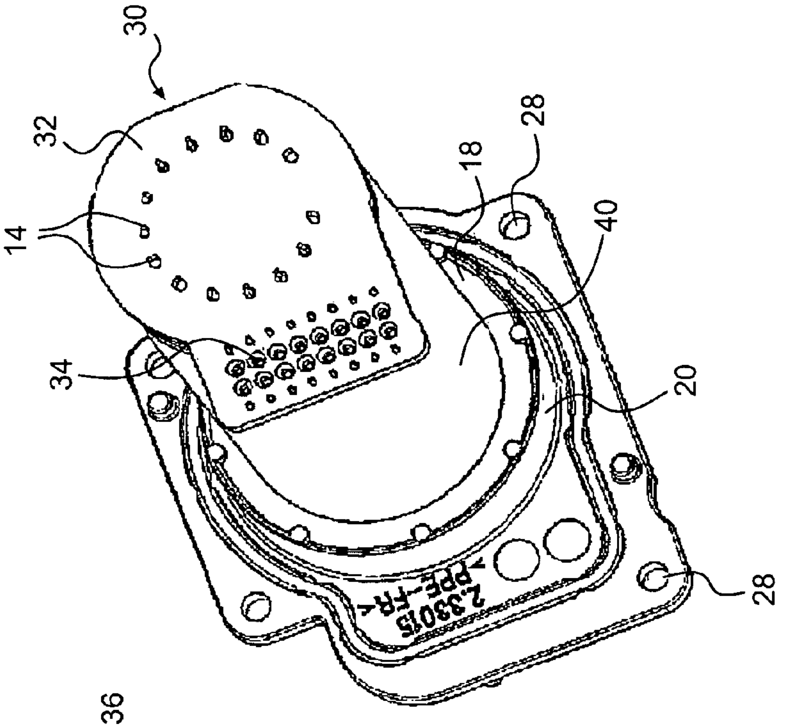
Figure 2A:
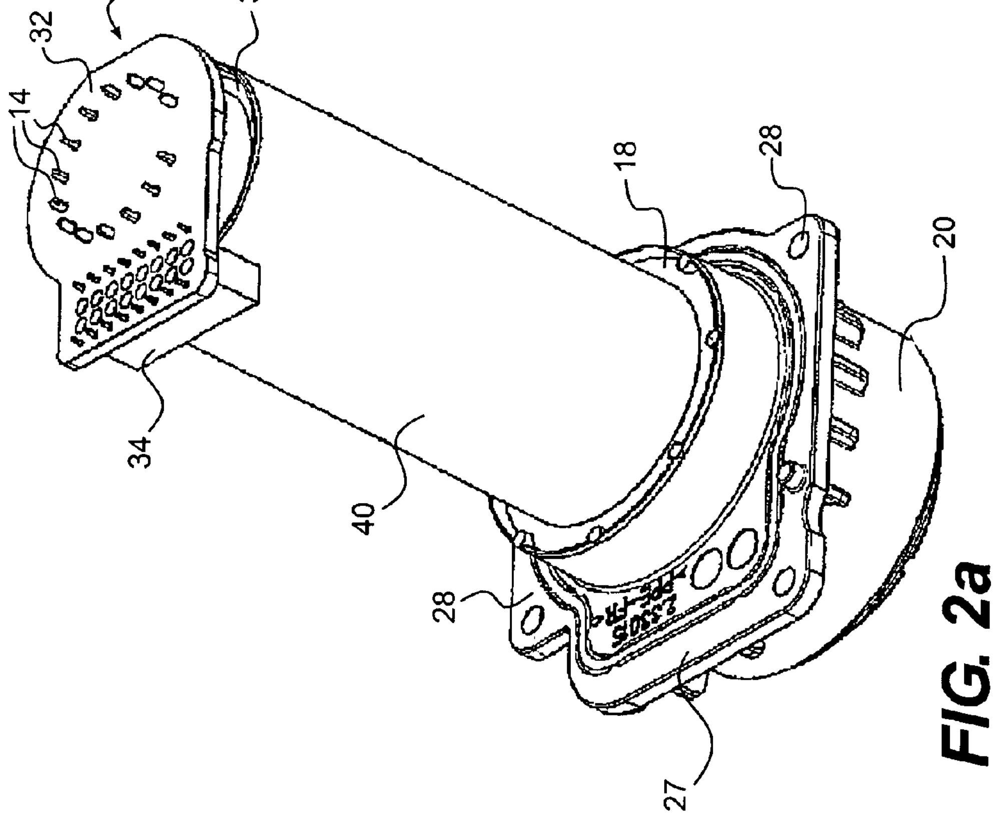

The invention is next described in detail with reference to the attached figures. Shown are:

FIG. 1 a longitudinal section through a photomultiplier and fastening device, according to the invention FIG. 2*a* a perspective view of the photomultiplier of FIG. 1

Figure 3B:
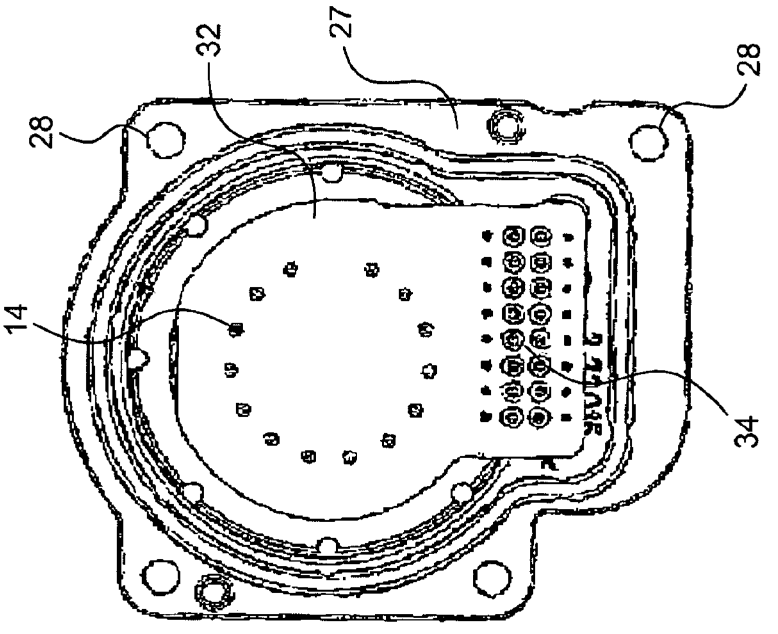
Figure 3A:
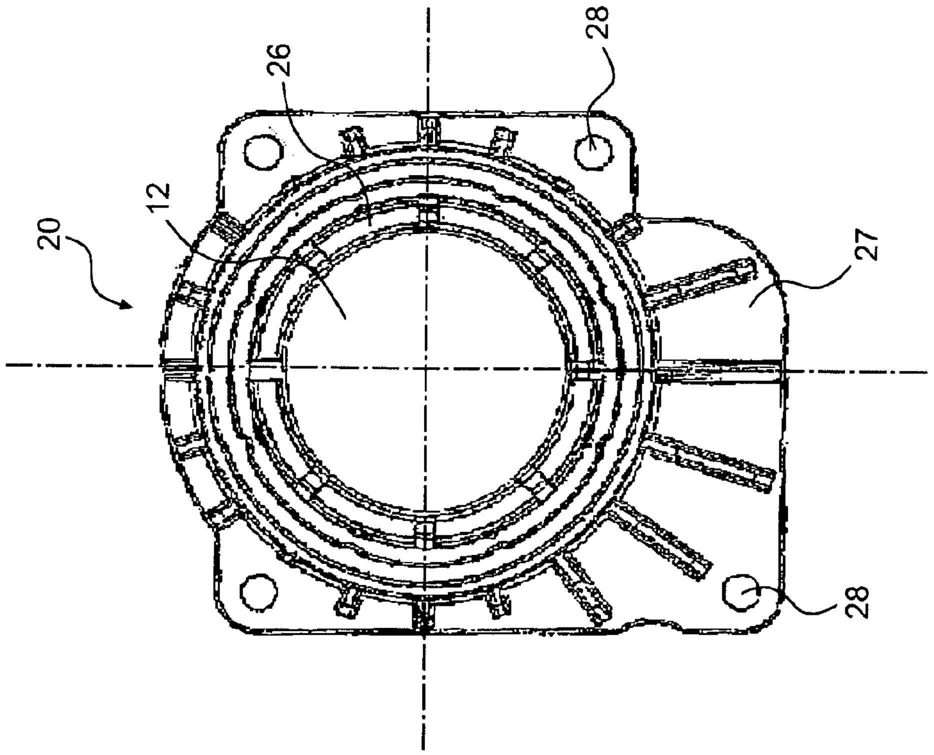
Figure 4:
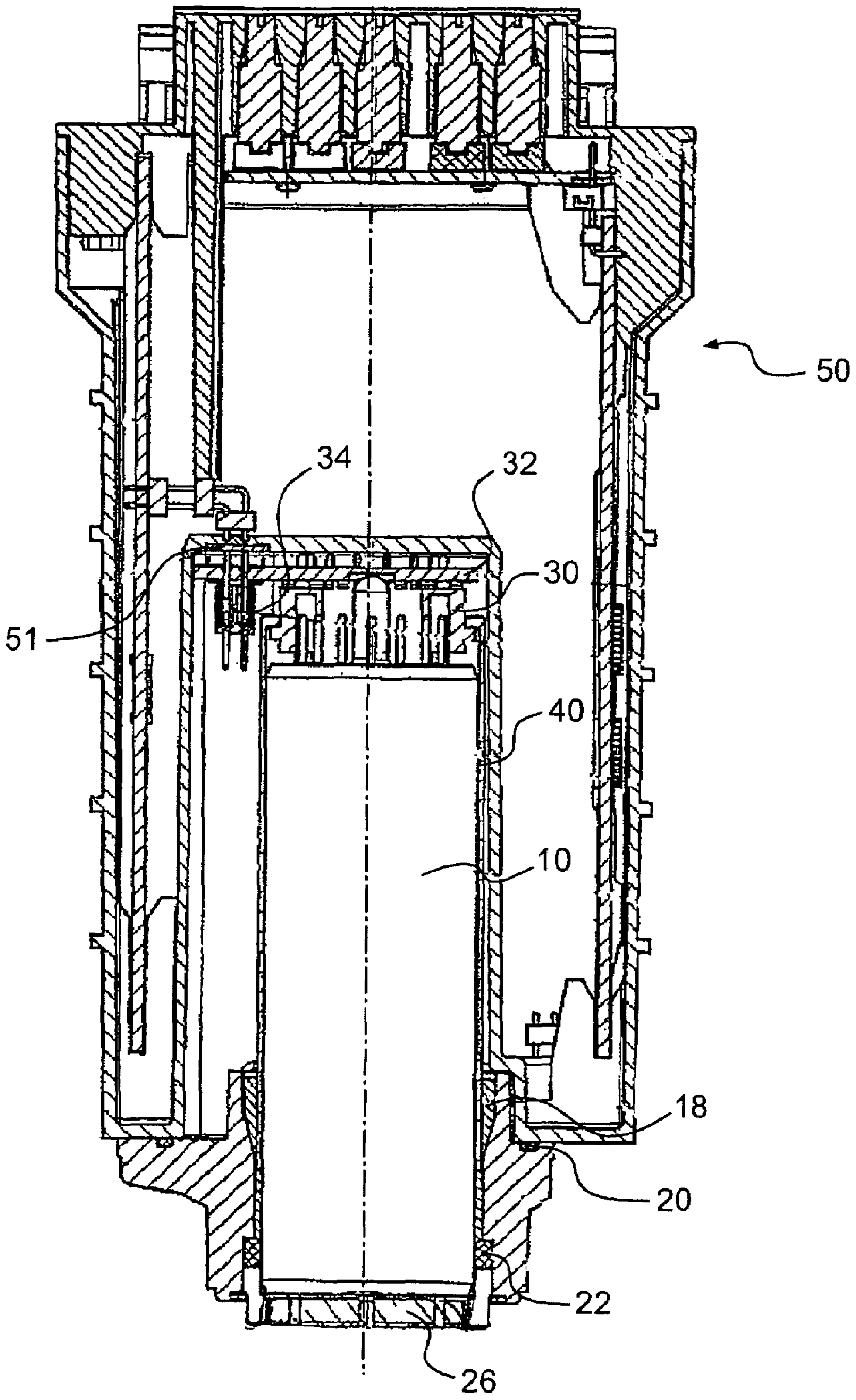

FIG. 2*b* a perspective view of the photomultiplier of FIG. 2*a*, from a different angle of view FIG. 3*a* a top view of the light inlet of the photomultiplier with fastening device FIG. 3*b* a top view of the plug contact of the photomultiplier FIG. 4 a longitudinal section through a housing containing electronics, with the photomultiplier and fastening device installed inside the housing FIG. 1 provides a longitudinal section through the photomultiplier with fastening device, in accordance with the invention. The photomultiplier 10 has a cylindrical body 11 made of glass, which is surrounded circumferentially by a tubular jacket 13, so that the only exposed part is a light inlet 12 at the front end. Connecting contacts 14 are provided on the back end of the photomultiplier 10, over which an electrical signal, which is produced by a light flash received through the light inlet 12, can be scanned. A problem is posed by the fact that any radial clamping of the photomultiplier 10 by the tubular jacket 13 fails to provide a secure fastening capability. Moreover, such clamping would have a disadvantage in that temperature-dependent changes in volume in a clamping sleeve will conduct potentially destructive forces to the cylindrical glass body 11 of photomultiplier 10. The tubular connecting component 40, e.g., a metal tube, surrounds the photomultiplier 10 and by means of a bayonet coupling engages at the back end with a plug contact 30, which is seated on the connecting contacts 14 of the photomultiplier. The bayonet coupling is so designed that the plug contact 30 has a circumferential rim in which at least two circumferential recesses 37 are provided, into which fit the corresponding projections positioned on the connecting component 40, so that after the connecting component is rotated, there is a form-fitting connection, in accordance with the bayonet design. The connecting tube 40 thus serves as a connecting and fastening component and also provides the photomultiplier 10 with mechanical protection from external influences.

To produce an electrical connection to the photomultiplier, the plug contact 30 has a mounting plate 32, by means of which the electrical signals of the connecting contacts 14 are conducted to a connector jack 34. When the configuration is in assembled condition, the connector jack 34 is positioned so that it lies outside the circumference of the connecting tube 40. The connector jack 34 is designed so that contact pins 51 for contacting said connector jack 34 can be plugged all the way through the connector jack 34, with the result that it is possible to provide a wider longitudinal adjustment when the configuration according to the invention is installed.

On the front end, a socket 20 which serves as a mounting fixture is positioned on connecting tube 40 and on the photomultiplier 10. The connector socket 20 has a reception hole of cylindrical shape, which is sealed at the front by a circumferential rim. The circumferential rim 36 serves as a stop for the photomultiplier 10 at the front end and prevents the photomultiplier 10 from slipping through the socket 20 and sliding out of the fastening device at the front end. The rim 36 has dimensions such that it can only rest in the lateral area of the light inlet 12 and at the same time can center the photomultiplier 10 after a slight degree of adjustment. Further centering of the photomultiplier 10 is provided by a seal 22 which lies in a groove 23 on the inside of the socket 20. The sealing ring 22 also insures that a sealing compound 18, which produces the connection between the connecting tube 40, the photomultiplier 10, and the socket 20, is prevented from running out of the fastening device on the front end and thereby soiling, e.g., the light inlet 12. The employed sealing compound 18 can be, e.g., a PUR adhesive from the Delo company.

To further insure the centered alignment of the configuration of photomultiplier 10 and connecting tube 40 within the socket 20, the socket 20 also has so-called bumper ribs 25 toward the back. These guide the photomultiplier 10 and the connecting tube 40 into a centered position.

On the front end there is a circumferential platform 26 that both insures that mechanical influence are kept away from the optical inlet 12 of the photomultiplier 10 and serves as a centering ring for a optical conductor sheet, which is placed here in order to produce a defined refractive index between a scintillator and the photomultiplier.

As can be clearly seen in FIG. 1, the configuration according to the invention makes it possible to create a force-fitting connection between the plug contact 30 and the socket 20, so that the photomultiplier 10 can be mounted with a definite separating distance between the light inlet 12 and the forward edge of the socket 20.

FIGS. 2*a* and 2*b* give a perspective view of the photomultiplier 10 and fastening device shown in FIG. 1. Since the two FIGS. 2*a* and 2*b* differ only in the angle of view they provide onto the configuration, the two are explained jointly.

FIGS. 2*a* and 2*b* show the assembled configuration, where the photomultiplier 10 is seated in the connecting tube 40, the plug contact 30 is secured at the back end, and the socket 20 is secured at the front end with an adhesive bond. In this depiction, it is evident in particular that the basically cylindrical socket 20 has a mounting rim 27 around its central portion, where boreholes 28 have been provided. The mounting rim 27 is basically rectangular in shape and includes a plurality of recesses, and the result is a coded shape that insures torque-proof installation in a predetermined position. In assembling the configuration, care must taken to insure that the coded shape of the mounting rim 27 is correctly aligned with the mounting plate 32 of the plug contact 30 in the back-end area. The mounting plate 32 of the plug contact 30 is also designed to have a coded shape. When the configuration is installed in a housing, the key-and-lock design guarantees that the connector jack 34 is correctly contacted.

FIG. 3*a* gives a top view of the light inlet 12 of the photomultiplier 10, mounted in the socket 20. In this depiction the mounting rim 27, with the boreholes 28 and the coded shape of the mounting rim 27, can be identified with particular ease. The photomultiplier 10 is centrally seated in the socket 20 and is protected from impacts over a large area on the front end by the circumferential platform 26 on the socket 20.

FIG. 3*b* gives a top view of the plug contact 30 in the assembled state. In this depiction, the coded shape of the mounting plate 32, which is aligned with the mounting rim 27 of the socket 20, can be easily identified. The connecting contacts 14 of the photomultiplier, arranged in circular fashion, are also coded, in that said connecting contacts, arranged equidistantly over the circumference, are missing a pin at a certain point. The matching design of the mounting plate thus provides a defined configuration for the connection.

As stated above, the connector jack 34 is designed as a perforated socket, so that contacting is performed by inserting the contact pins 51 into a hole in the connector jack 34. In this manner, the contact pins 51 can be introduced into the connector jack 34 at variable lengths, in accordance with the installation length of the photomultiplier 10 and thus of the assembly configuration. When the contact pins 51 have a suitable length, variations in the installation length of the photomultiplier can be adjusted for.

Finally, FIG. 4 shows the photomultiplier 10 and the fastening device when they are installed in a housing. Depicted is a longitudinal section through the electronics housing, which corresponds to the section shown in FIG. 1. Since the design of the photomultiplier and fastening device have already been described in detail in connection with FIG. 1, only the manner of contacting the connector jack 34 with the contact pins 51 of the electronics housing 50 will be dealt with here. The contact pins 51 are designed to a have a length that permits adjustment vis-à-vis the 10 mm variation in the length of the photomultiplier 10. In the embodiment shown in FIG. 4, the length of the photomultiplier 10 approaches the maximum possible installation length, so that the mounting plate 32 almost rests against the back wall of the electronics housing 50 upon installation in said housing 50. When the photomultiplier 10 has a shorter installation length, the fastening device nonetheless assures that the light inlet 12 has a defined front edge, and the contact pins 51 assure that the configuration is contacted at the back end. With the design thus described, the photomultiplier 10 with the fastening device can be replaced as a module, while secure contacting remains guaranteed, as does a defined position for the light inlet 12. When the configuration consisting of photomultiplier 10 and fastening device is assembled, the light inlet 12 is pressed against the circumferential rim 36 at the front end by the bracing of the connecting tube 40 at the back end and of the plug contact 30 attached with the bayonet coupling. This arrangement becomes fixed when the connecting tube 40 is glued to the socket 20. When the configuration is braced, the connecting tube 40 extends into the socket 20 to a depth that varies with the installation length of the photomultiplier 10, and thereby assures the force-fitting connection between the plug contact 30 and the socket 20.

LIST OF REFERENCE NUMERALS

10 photomultiplier
11 cylindrical glass body
12 light inlet
14 connecting contacts

18 adhesive bond
20 socket
22 seal
23 groove
24 rim
25 bumper rib
26 platform
27 mounting rim
28 boreholes
30 plug contact
32 mounting plate
34 connector jack
36 rim
37 recess
40 connecting component/connecting tube
42 projection
50 electronics housing
51 contact pins

The invention claimed is:

1. Photomultiplier with a fastening device, where the photomultiplier has a solid cylindrical body and a tubular jacket, a light inlet on the front end and connecting contacts on the back end, and where the fastening device has a socket on the front end and a plug contact resting on the connecting contacts on the back end, and where a force-fitting and form-fitting connection is produced between the plug contact and the socket by means of a connecting component.

2. Photomultiplier according to claim one, wherein the connecting component is tubular in shape.

3. Photomultiplier according to claim one, wherein an adhesive bond is positioned between the connecting component and the socket.

4. Photomultiplier according to claim one, wherein a longitudinal adjustment of manufacturing tolerances in the photomultiplier is possible through the variable overlapping of the connecting component and the socket.

5. Photomultiplier according to claim three, wherein the adhesive bond consists of a sealing compound.

6. Photomultiplier according to claim one, wherein the connecting component and the plug contact are connected by means of a bayonet coupling.

7. Photomultiplier according to claim one, wherein a sealing ring is positioned between an inner wall of the socket and the photomultiplier.

8. Photomultiplier according to claim one, wherein the socket has an inner circumferential rim on the front end.

9. Photomultiplier according to claim one, wherein the socket has a circumferential platform on the front end.

10. Photomultiplier according to claim one, wherein a defined distance can be established between a front edge of the socket and a front edge of the photomultiplier.

11. Photomultiplier according to claim one, wherein the solid body is a glass body.

* * * * *